United States Patent
Luu et al.

(10) Patent No.: US 9,580,046 B2
(45) Date of Patent: Feb. 28, 2017

(54) ENTRY ASSIST SYSTEM FOR A MOTOR VEHICLE

(71) Applicant: FORD GLOBAL TECHNOLOGIES, LLC, Dearborn, MI (US)

(72) Inventors: Doug Luu, Westland, MI (US); Tai Luu, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 14/567,660

(22) Filed: Dec. 11, 2014

(65) Prior Publication Data
US 2016/0167621 A1    Jun. 16, 2016

(51) Int. Cl.
| | |
|---|---|
| E05F 15/00 | (2015.01) |
| F02N 11/08 | (2006.01) |
| E05F 15/20 | (2006.01) |
| B60R 25/20 | (2013.01) |
| E05F 15/73 | (2015.01) |
| B60R 25/04 | (2013.01) |

(52) U.S. Cl.
CPC .......... B60R 25/2054 (2013.01); E05F 15/73 (2015.01); F02N 11/0822 (2013.01); *B60R 2025/0405* (2013.01); *E05Y 2900/546* (2013.01); *F02N 2200/106* (2013.01)

(58) Field of Classification Search
CPC ......... B60R 25/2054; B60R 2025/0405; E05F 15/73; F02N 11/0822; F02N 2200/106; F02N 11/08; F02N 11/0803; F02N 11/0807; E05Y 2900/546
See application file for complete search history.

(56) References Cited

U.S. PATENT DOCUMENTS

| | | | |
|---|---|---|---|
| 6,498,970 B2* | 12/2002 | Colmenarez ........ | B60R 25/2045 382/116 |
| 7,688,179 B2 | 3/2010 | Kurpinski et al. | |
| 7,813,773 B2 | 10/2010 | Yamamoto et al. | |
| 8,091,280 B2 | 1/2012 | Hanzel et al. | |
| 8,228,166 B2 | 7/2012 | Eberhard | |
| 8,688,325 B2 | 4/2014 | Wolf et al. | |
| 2011/0242303 A1* | 10/2011 | Giraud .................... | E05B 81/78 348/77 |
| 2011/0248820 A1* | 10/2011 | Gehin ................ | G07C 9/00309 340/5.72 |

(Continued)

FOREIGN PATENT DOCUMENTS

| | | |
|---|---|---|
| WO | 0225040 A1 | 3/2002 |
| WO | 2014064297 A1 | 5/2014 |

OTHER PUBLICATIONS

"Killer Car Apps for 2013"; http://techmandra.blogspot.in/2012/04/killer-car-apps-for-2013.html printed on Oct. 22, 2014; 13 pages.

*Primary Examiner* — Todd Melton
(74) *Attorney, Agent, or Firm* — Jason Rogers; King & Schickli, PLLC

(57) ABSTRACT

An entry assist system for a motor vehicle includes a door, a door operation module to open and close the door and a starter actuator for starting an engine of the motor vehicle. The entry assist system further includes a control subsystem. The control subsystem includes a gesture sensor and a controller. The controller is responsive to the gesture sensor to open the door and start the engine of the motor vehicle.

14 Claims, 3 Drawing Sheets

(56) References Cited

U.S. PATENT DOCUMENTS

| | | |
|---|---|---|
| 2011/0276234 A1 | 11/2011 | Van Gastel |
| 2013/0234828 A1 | 9/2013 | Holzberg et al. |
| 2013/0291439 A1 | 11/2013 | Wuerstlein et al. |
| 2014/0156112 A1 | 6/2014 | Lee |
| 2015/0088404 A1* | 3/2015 | Geissenhoener ...... B60K 28/04 701/112 |
| 2015/0127193 A1* | 5/2015 | Tofilescu ................ E05F 15/73 701/2 |
| 2015/0161836 A1* | 6/2015 | Park ................... G07C 9/00134 340/5.51 |
| 2015/0283886 A1* | 10/2015 | Nania ..................... E05F 15/73 296/146.4 |

* cited by examiner

ENTRY ASSIST SYSTEM FOR A MOTOR VEHICLE

TECHNICAL FIELD

This document relates generally to an entry assist system for a motor vehicle and, more particularly, to a hands-free entry assist system which opens the door, closes the door and starts the vehicle.

BACKGROUND

Hands-free entry assist systems for motor vehicles have been provided as a convenience feature to vehicle operators. Such systems are particularly useful when an operator approaches a vehicle carrying one or more objects in both hands. It is particularly beneficial in inclement weather as such a system allows relatively quick entry into the vehicle without having to place the objects on top of the vehicle or on the ground where they may become even more exposed to moisture before being placed in the vehicle.

This document specifically relates to a new and improved entry assist system that not only opens and closes the door but also automatically starts the engine of the motor vehicle thereby substantially reducing vehicle preparation time before being ready for driving.

SUMMARY

In accordance with the purposes and benefits described herein, an entry assist system is provided for a motor vehicle. That entry assist system comprises a door, a door operation module to open and close the door, a starter for starting an engine of the motor vehicle, a starter actuator and a control subsystem. The control subsystem includes a gesture sensor and a controller. The controller is responsive to the gesture sensor to open the door and start the engine.

In one possible embodiment the gesture sensor is carried on an exterior of the vehicle and monitors a scan field adjacent a bottom edge of the door.

In one possible embodiment, the control subsystem further includes an entry sensor to detect an individual entering the vehicle through an opening created when the door is opened. In such an embodiment, the controller is responsive to the entry sensor to close the door after the entry of an individual into the vehicle has been detected.

In one possible embodiment, the door operation module includes a lock actuator to latch and unlatch a lock on the door and a door actuator to open and close the door.

In another possible embodiment, the entry assist system includes a key fob carried by an operator of the vehicle. That key fob transmits an authorized operator code. Further the control subsystem includes a receiver for receiving the authorized operator code from the key fob. The controller opens the door and starts the vehicle only after confirming the authorized operator code matches a predetermined authorized operator code for the motor vehicle.

In accordance with yet another embodiment, the entry assist system includes a second door and a second door operation module. The second door operation module includes a second lock actuator to latch and unlatch a second lock on the second door and second door actuator to open and close the second door. Further the control subsystem includes a second gesture sensor associated with the second door. The controller is responsive to the second gesture sensor to open and close the second door.

In accordance with an additional aspect, a method is provided of assisting an operator to enter a motor vehicle. That method may be broadly described as comprising the steps of detecting, by gesture sensor, a gesture made by the operator, opening, by door actuator, a door of the vehicle in response to the gesture and starting, by starter actuator, an engine of the vehicle in response to the gesture. Further the method may include detecting a vehicle operator authorization code, comparing that detected vehicle authorization code to a predetermined vehicle authorization code for the motor vehicle and confirming that the detected vehicle authorization code and predetermined vehicle authorization code match before opening the door and starting the engine. Still further the method may include detecting entry of an individual into the vehicle through an opening created when the door is opened before starting the engine. In addition the method may include closing the door in response to detecting entry of the individual into the vehicle.

In the following description, there are shown and described several preferred embodiments of the entry assist system and its related method of operation. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the entry assist system and together with the description serve to explain certain principles thereof. In the drawing figures.

Reference will now be made in detail to the present preferred embodiment of the entry assist system, examples of which are illustrated in the accompanying drawing figures.

DETAILED DESCRIPTION

Figure 1:
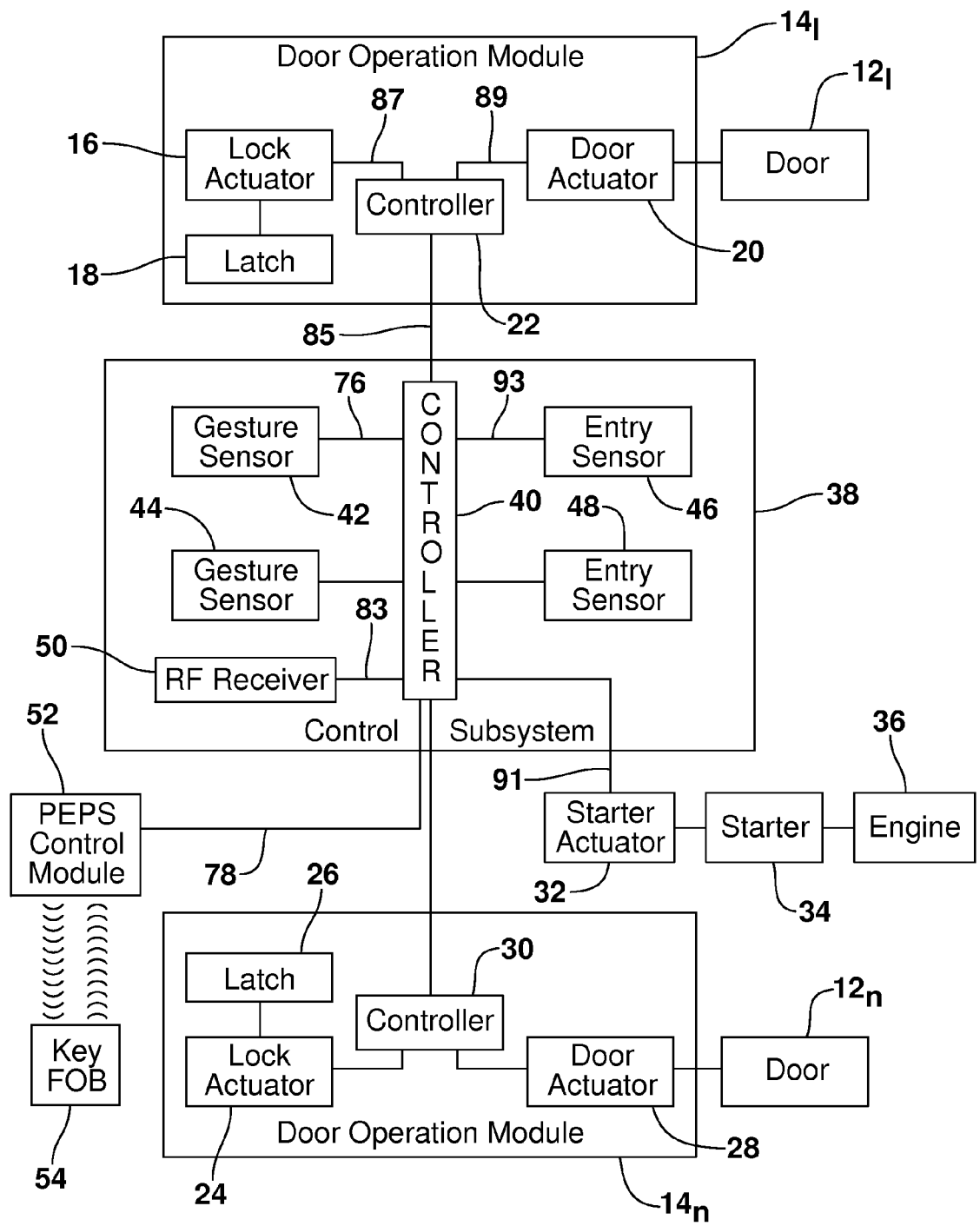
FIG. 1 is a block diagram of the entry assist system including one or more door operation modules and the associated control subsystem.

Reference is now made to FIG. 1 which is a schematical block diagram illustration of the entry assist system 10 for a motor vehicle. As illustrated, the entry assist system 10 incorporates one or more doors $12_1$-$12_n$. A door operation module $14_1$-$14_n$ is provided for each door $12_1$-$12_n$. The door operation module $14_1$-$14_n$, opens and closes the door $12_1$-$12_n$ to which it is associated or connected.

In the embodiment illustrated in FIG. 1, the entry assist system 10 includes two doors $12_1$, $12_n$ and two door operation modules $14_1$, $14_n$. It should be appreciated that the entry assist system 10 includes substantially any number of doors $12_1$-$12_n$ and associated door operation modules $14_1$-$14_n$ including, anywhere from one to four or more as required for any particular motor vehicle application.

Door operation module $14_1$ includes a lock actuator 16 to selectively latch or unlatch latch 18 of the door $12_1$. Further the door operation module $14_1$ includes a door actuator 20 to selectively open and close the door $12_1$. In the illustrated embodiment, the door operation module $14_1$ also includes a controller 22, such as a dedicated microprocessor or electronic control unit (ECU) that controls the operation of the lock actuator 16 and the door actuator 20.

The door operation module $14_n$ is similar to the door operation module $14_1$ and includes a lock actuator 24 to latch and unlatch the latch 26 of the door $12_n$, a door actuator 28 to selectively open and close the door $12_n$ and a controller 30 to control the operation of lock actuator 24 and door actuator 28.

As also illustrated in FIG. 1, the entry assist system 10 further includes a starter actuator 32 that is connected to a starter 34 which is operated to start an internal combustion engine 36 of the motor vehicle.

Still further, the entry assist system 10 includes a control subsystem 38. Control subsystem 38 includes a controller 40 which may, for example, take the form of a dedicated microprocessor or ECU. Further the control subsystem 38 of the illustrated embodiment includes two gesture sensors 42, 44, two entry sensors 46, 48 and an RF receiver 50 all connected to the controller 40. In one possible embodiment, control subsystem 38 comprises a body control module or BCM having one or more processors, one or more memories, one or more network interfaces, a human interface, a GPS/geo locator component, a display device such as a multifunction display with touchscreen capability and a speech processor that all communicate with each other over a communication bus. Such a BCM performs a number of interior body electrically based functions including, for example, interior locking, remote key entry, interior lighting, exterior lighting, windshield wiper control and the like. In some embodiments the BCM may also function to control entertainment functions (e.g. radio, CD player and communications such as telephone and Internet communications over a wireless network). In some embodiments the BCM is connected by a communication bus to other control modules that provide one or more of these additional functions.

In any of the embodiments, the gesture sensor 42 and the entry sensor 46 are associated with the first door $12_1$ while the gesture sensor 44 and the entry sensor 48 are associated with the second door $12_n$. In one possible embodiment, the gesture sensor 42 is carried on an exterior of the vehicle adjacent the bottom of the door $12_1$ and monitors a scan field adjacent a bottom edge of that door. There the sensor 42 may scan for feet movements of the operator when the operator approaches the door $12_1$ of the vehicle.

Similarly, the gesture sensor 44 is carried on an exterior of the vehicle adjacent the second door $12_n$ where it may monitor a scan field adjacent the bottom edge of that door.

The entry sensor 46 may be positioned on or below the beltline of the vehicle where it has a scan field capable of monitoring the opening created when the vehicle door $12_1$ is opened. Similarly, the entry sensor 48 may be mounted in a similar area adjacent the second door $12_n$ where it produces a scan field capable of monitoring the opening produced when the door $12_n$ is opened.

While two gesture sensors 42, 44 and two entry sensors 46, 48 are provided in the illustrated embodiment, it should be appreciated that, if desired, one gesture sensor and one entry sensor may be provided for each door $12_1$-$12_n$ of the motor vehicle.

Figure 2:
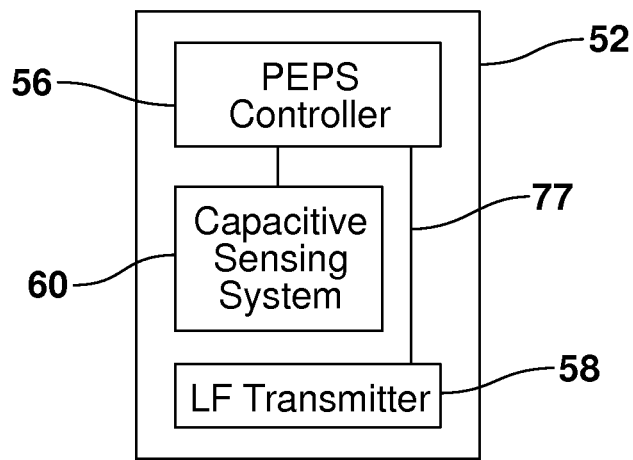
FIG. 2 is a schematic block diagram of a PEPS control module that may be operatively connected to a controller of the control subsystem.

As further illustrated in FIG. 1, the controller 40 is connected to a passive entry passive start (PEPS) control module 52 which is in wireless communication with a key fob 54 carried by the authorized operator of the motor vehicle. As illustrated in FIG. 2, the control module 52 includes a PEPS controller or ECU 56, a low-frequency transmitter 58 and a presence, touch or capacitive sensing system or sensor 60.

Figure 3:
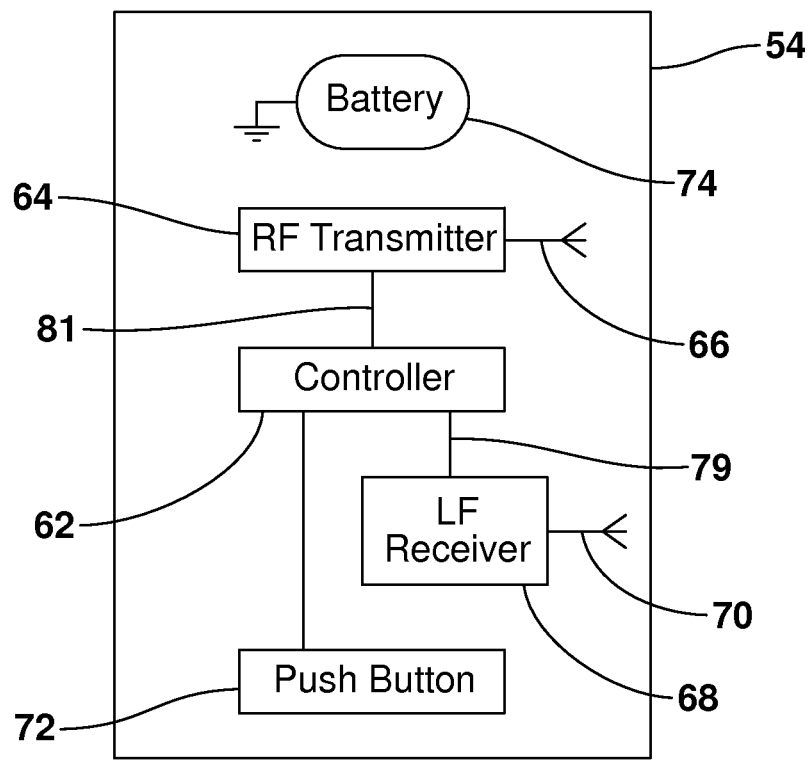
FIG. 3 is a schematic block diagram of a key fob that may be used by the operator and that communicates with the PEPS control module, such as the PEPS control module embodiment illustrated in FIG. 2.

As illustrated in FIG. 3, the key fob 54 includes a controller 62 connected to a radiofrequency transmitter 64, having an antenna 66, and a low-frequency receiver 68, connected to an antenna 70. The controller 62 may be activated by an actuator or pushbutton 72. As further illustrated, the components of the key fob 54 are powered by a power source or battery 74.

The method of operation of the entry assist system 10 will now be described in detail. As the vehicle operator approaches the driver's side door $12_1$, his hands are occupied carrying a number of objects. The key fob 54 is, however, held in his pocket. Upon reaching the vehicle, the operator initiates a gesture such as the sweeping of a foot through the scan field adjacent the bottom of the door $12_1$ that is being monitored by the gesture sensor 42. Upon detecting the sweeping motion, the gesture sensor 42 sends a signal along the signal line 76 to the controller 40. In response, the controller 40 sends a signal on the signal line to the PEPS controller 56. That controller 56 then sends a signal along line 77 causing the low-frequency transmitter 58 to emit a low-frequency signal. The low-frequency receiver 68 in the key fob 54 detects that signal and then sends an appropriate signal along line 79 to the controller 62 which in turn sends a control signal along line 81 to the RF transmitter 64 which transmits a key code or vehicle authorization code over the antenna 66 to the RF receiver 50 of the control subsystem 38. That vehicle authorization code is then sent through the control line 83 to the controller 40 where it is compared to a predetermined vehicle authorization code for the motor vehicle. Upon confirming a match to the predetermined vehicle authorization code, the controller 40 sends a signal to the controller 22 of the door operation module $14_1$ along lines 85. The controller 22 sends signals to the lock actuator 16 and door actuator 20 along lines 87, 89 whereby the latch 18 is unlatched and the door $12_1$ is opened.

In one possible embodiment, the controller 40 simultaneously sends a control signal along line 91 to the starter actuator 32 which activates the starter 34 to start the engine 36 of the motor vehicle. In other embodiments, such a signal may be delayed including, for example, until the entry sensor 46 confirms entry of the individual into the vehicle through the opening created by the open door $12_1$.

When the operator enters the vehicle through the opening created by the open door $12_1$, that entry into the vehicle is detected by the entry sensor 46 and a signal to that effect is sent along control line 93 to the controller 40. The controller 40 then sends a control signal along line 85 to the controller 22 which, in turn, sends a control signal along the line 89 to the door actuator 20 which closes the door $12_1$. If desired, the presence of the operator in the driver's seat of the vehicle may also be confirmed by a weight sensor, camera, ultrasonic sensor, an infrared sensor, radar or other appropriate means.

Gesture sensor 44 and the components 24, 26, 28 and 30 of the door operation module $14_n$ operate in the same manner to control operation of the door $12_n$ for a second individual approaching the second door. The only difference is the vehicle motor is not automatically started upon entry into the vehicle through any door other than the driver's door: that is, door $12_1$ in the illustrated embodiment.

Figure 4:
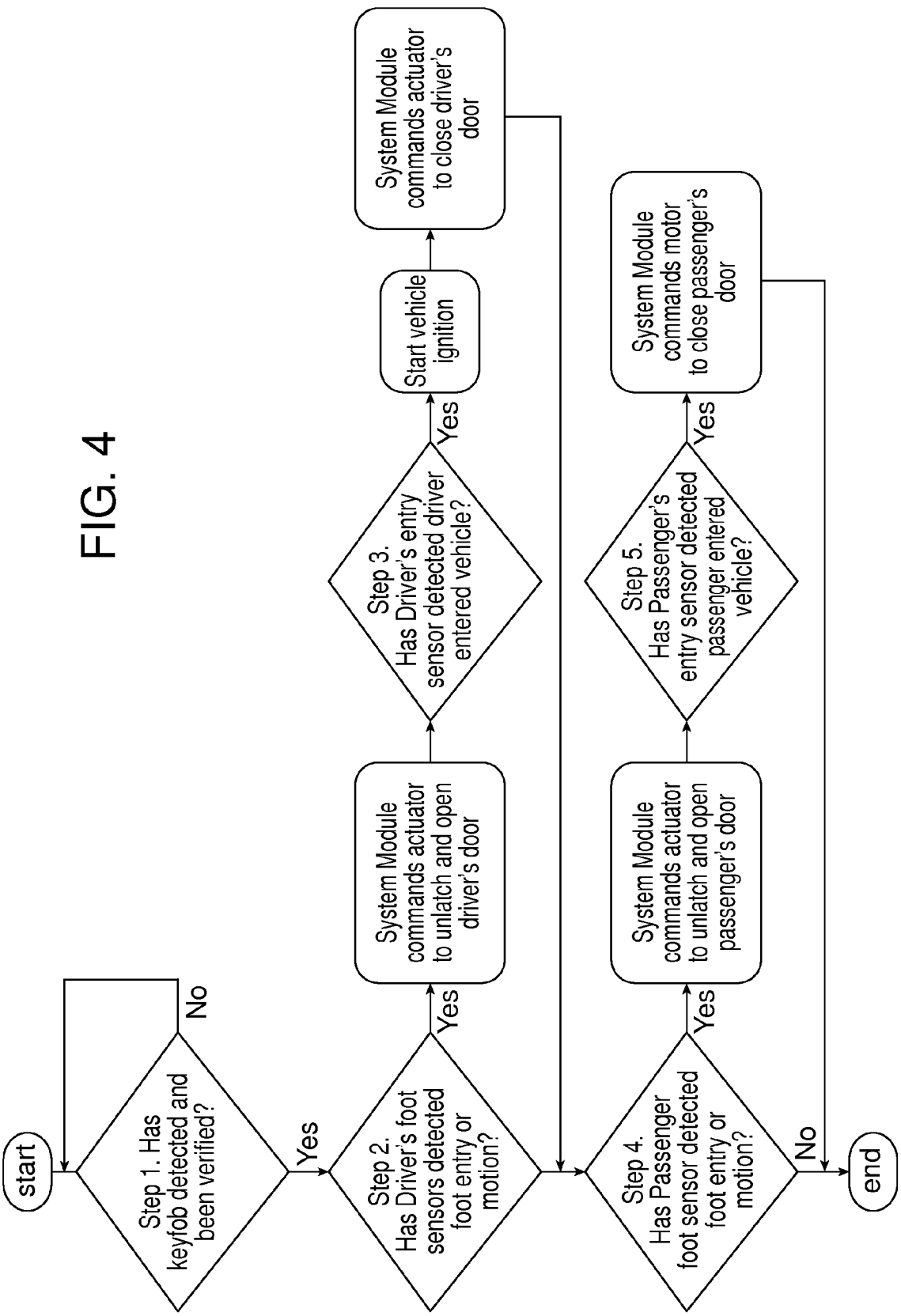
FIG. 4 is a flowchart of the operation of the entry assist system.

The operation of the entry assist system 10 is summarized in the schematic diagram of FIG. 4.

The gesture sensors 42, 44 and entry sensors 46, 48 utilized for the entry assist system 10 may take substantially any appropriate form including, but not limited to, motion sensors, capacitive sensors, ultrasonic sensors, radar sensors, sonar sensors, cameras and proximity sensors. Here it should also be appreciated that the terminology "gesture sensor" should be broadly interpreted to include a sensor that detects any specific type or form of body movement or motion.

Advantageously, the entry assist system 10 is associated with a unique method of assisting an operator to enter a motor vehicle. That method may be broadly described as comprising the steps of (1) detecting, by gesture sensor, a gesture made by the operator, (2) opening, by means of a door actuator, a door of the vehicle in response to the gesture and (3) starting, by starter actuator, an engine of the vehicle in response to the gesture. The method may also include the steps of detecting a vehicle authorization code, comparing the detected vehicle authorization code to a predetermined vehicle authorization code for the motor vehicle and confirming that the detected vehicle authorization code and predetermined vehicle authorization code match before opening the door and starting the engine. Still further, the method may include detecting the entry of an individual into the vehicle through an opening created when the door is opened before starting the engine of the motor vehicle. The door may then be closed in response to detecting entry of that individual. It is believed that this is the first entry assist system 10 and method that not only opens the door but starts the vehicle without the manipulation of any switches or controls by the hands of the operator. Advantageously the system prepares the vehicle to be driven in a shorter period of time for the convenience of the operator.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An entry assist system for an operator of a motor vehicle, comprising:
   a door;
   a door operation module to open and close said door;
   a starter actuator to start an engine of said motor vehicle; and
   a control subsystem including a gesture sensor for detecting a gesture made by said operator and a controller, said controller being responsive to said gesture to open said door and start said engine.

2. The system of claim 1, wherein said gesture sensor is carried on an exterior of said vehicle and monitors a scan field adjacent a bottom edge of said door.

3. The system of claim 1, wherein said control subsystem further includes an entry sensor to detect an individual entering said vehicle through an opening created when said door is opened.

4. The system of claim 3, wherein said controller is responsive to said entry sensor to close said door.

5. The system of claim 1, wherein said door operation module includes a lock actuator to latch and unlatch a latch on said door and a door actuator to open and close said door.

6. The system of claim 5, wherein said entry assist system includes a key fob carried by an operator of said vehicle that transmits an authorized operator code.

7. The system of claim 5, wherein said control subsystem includes a receiver for receiving said authorized operator code from said key fob, said controller opening said door and starting said vehicle only after confirming said authorized operator code matches a predetermined authorized operator code for the motor vehicle.

8. The system of claim 7, further including a second door and a second door operation module.

9. The system of claim 8, wherein said second door operation module includes a second lock actuator to latch and unlatch a second latch on said second door and a second door actuator to open and close said second door.

10. The system of claim 9, wherein said control subsystem includes a second gesture sensor associated with said second door, said controller being responsive to said second gesture sensor to open and close said second door.

11. A method of assisting an operator to enter a motor vehicle, comprising:
    detecting, by gesture sensor, a gesture made by said operator;
    opening, by a door actuator, a door of said vehicle in response to said gesture; and
    starting, by a starter actuator, an engine of said vehicle in response to said gesture.

12. The method of claim 11, further including detecting a vehicle operator authorization code comparing the detected vehicle authorization code to a predetermined vehicle authorization code for said motor vehicle and confirming that said detected vehicle authorization code and said predetermined authorization code match before opening said door and starting said engine.

13. The method of claim 12, further including detecting entry of an individual into said vehicle through an opening created when said door is opened before starting said engine.

14. The method of claim 13, further including closing said door in response to detecting entry of said individual into said vehicle.

* * * * *